United States Patent
Szymanski

(10) Patent No.: US 11,157,036 B2
(45) Date of Patent: Oct. 26, 2021

(54) MONITORING DELAY ACROSS CLOCK DOMAINS USING DYNAMIC PHASE SHIFT

(71) Applicant: Rockwell Collins, Inc., Cedar Rapids, IA (US)

(72) Inventor: Anthony Szymanski, Lucas, TX (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 12 days.

(21) Appl. No.: 16/739,803

(22) Filed: Jan. 10, 2020

(65) Prior Publication Data

US 2021/0216095 A1 Jul. 15, 2021

(51) Int. Cl.
*G06F 1/08* (2006.01)
*G06F 1/12* (2006.01)

(52) U.S. Cl.
CPC . *G06F 1/08* (2013.01); *G06F 1/12* (2013.01)

(58) Field of Classification Search
CPC .................................... G06F 1/08; G06F 1/12
See application file for complete search history.

(56) References Cited

U.S. PATENT DOCUMENTS

| | | | |
|---|---|---|---|
| 6,356,127 B1 | 3/2002 | Klipper et al. | |
| 7,495,495 B2 | 2/2009 | Zhang et al. | |
| 7,965,143 B2 | 6/2011 | Kawamura | |
| 8,225,259 B1 | 7/2012 | Mendel et al. | |
| 8,514,995 B1 | 8/2013 | Oh et al. | |
| 8,698,530 B2 | 4/2014 | Blondel et al. | |
| 9,319,050 B1 | 4/2016 | Guilford et al. | |
| 9,537,491 B1 | 1/2017 | Ganusov et al. | |
| 2011/0099410 A1 | 4/2011 | Yin et al. | |
| 2017/0054444 A1 | 2/2017 | Wainwright et al. | |

FOREIGN PATENT DOCUMENTS

| | | |
|---|---|---|
| CN | 102540865 A | 7/2012 |
| CN | 202586928 U | 12/2012 |
| CN | 102759730 B | 11/2013 |
| CN | 102843127 B | 1/2016 |
| CN | 104077257 B | 1/2017 |
| CN | 108389225 A | 8/2018 |

Primary Examiner — Stefan Stoynov
(74) Attorney, Agent, or Firm — Suiter Swantz pc llo

(57) ABSTRACT

A system and a method. The system may include a computing device configured for monitoring delay across clock domains using a dynamic phase shift. The computing device may be further configured to: use a counter value of a counter, a known primary clock period of a primary clock domain, a known secondary clock period of a secondary clock domain, and a current phase shift between a secondary clock and a phase shifted secondary clock to calculate a current offset between a last rising edge of the primary clock and a current rising edge of the secondary clock.

15 Claims, 8 Drawing Sheets

| EDGE | CLOCK 1 TIME (ns) | CLOCK 2 TIME (ns) |
|---|---|---|
| 0 | 0 | 0 |
| 1 | 10 | 12 |
| 2 | 20 | 24 |
| 3 | 30 | 36 |
| 4 | 40 | 48 |
| 5 | 50 | 60 |
| 6 | 60 | 72 |
| 7 | 70 | 84 |
| 8 | 80 | 96 |
| 9 | 90 | 108 |
| 10 | 100 | 120 |
| 11 | 110 | 132 |
| 12 | 120 | 144 |

FIG.6

MONITORING DELAY ACROSS CLOCK DOMAINS USING DYNAMIC PHASE SHIFT

BACKGROUND

Timestamping of data is an important part of characterizing data and analyzing the data in real-time or for post processing. Time alignment of data is important as data fusion from multiple sources becomes more prevalent. When running a single system with a common time source this timing is relatively easy to maintain. As the trend in systems moves to low cost multi-platform systems with more inputs, maintaining time synchronization between systems and data streams becomes more difficult. In order to maintain accurate time relationships, it can become necessary to know delays incurred during clock domain transitions of signals. The clock domains are often unrelated or can vary in their phase relationships from power cycle to power cycle. A method for determining this delay dynamically becomes necessary so that systems can be developed without time consuming calibrations or complex clock synchronization methodologies to achieve synchronization between the clock domains.

SUMMARY

In one aspect, embodiments of the inventive concepts disclosed herein are directed to a system including a computing device. The computing device may be configured to: use clocking resources to generate a phase shifted secondary clock that is equal in frequency to a secondary clock domain, wherein the phase shifted secondary clock is phase shifted by a variable amount from the secondary clock; generate a calibration signal in a primary clock domain; capture the calibration signal in each of a secondary clock domain and the phase shifted secondary clock domain; compare a captured calibration signal value in each of the secondary clock domain and the phase shifted secondary clock domain to find a zero state where values are different, wherein the different values indicate that a primary clock domain edge occurred between the secondary clock and the phase shifted secondary clock; adjust the phase shifted secondary clock domain to be greater than an expected shift based on clock frequencies; compare a subsequent captured calibration signal value in each of the secondary clock domain and the phase shifted secondary clock domain to find a subsequent zero state where values are different; adjust a phase shift of the phase shifted secondary clock until a shift causes all subsequent phase shifts to match such that there is not any zero state; adjust a phase shift of the phase shifted secondary clock less than expected based at least on clock frequency and continue to compare additional captured calibration signal values until zero states are found again; generate a counter in the secondary clock domain aligned to a found zero state between phase shifts; adjust a phase shift to a next expected value based on the clock frequencies; and use a counter value of the counter, a known primary clock period of the primary clock domain, a known secondary clock period of the secondary clock domain, and a current phase shift between the secondary clock and the phase shifted secondary clock to calculate a current offset between a last rising edge of the primary clock and a current rising edge of the secondary clock.

In a further aspect, embodiments of the inventive concepts disclosed herein are directed to a method. The method may include: using, by a computing device, clocking resources to generate a phase shifted secondary clock that is equal in frequency to a secondary clock domain, wherein the phase shifted secondary clock is phase shifted by a variable amount from the secondary clock; generating, by the computing device, a calibration signal in a primary clock domain; capturing, by the computing device, the calibration signal in each of a secondary clock domain and the phase shifted secondary clock domain; comparing, by the computing device, a captured calibration signal value in each of the secondary clock domain and the phase shifted secondary clock domain to find a zero state where values are different, wherein the different values indicate that a primary clock domain edge occurred between the secondary clock and the phase shifted secondary clock; adjusting, by the computing device, the phase shifted secondary clock domain to be greater than an expected shift based on clock frequencies; comparing, by the computing device, a subsequent captured calibration signal value in each of the secondary clock domain and the phase shifted secondary clock domain to find a subsequent zero state where values are different; adjusting, by the computing device, a phase shift of the phase shifted secondary clock until a shift causes all subsequent phase shifts to match such that there is not any zero state; adjusting, by the computing device, a phase shift of the phase shifted secondary clock less than expected based at least on clock frequency and continue to compare additional captured calibration signal values until zero states are found again; generating, by the computing device, a counter in the secondary clock domain aligned to a found zero state between phase shifts; adjusting, by the computing device, a phase shift to a next expected value based on the clock frequencies; and using, by the computing device, a counter value of the counter, a known primary clock period of the primary clock domain, a known secondary clock period of the secondary clock domain, and a current phase shift between the secondary clock and the phase shifted secondary clock to calculate a current offset between a last rising edge of the primary clock and a current rising edge of the secondary clock.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 6 is an exemplary table associated with the graph of FIG. 5 according to the inventive concepts disclosed herein.

DETAILED DESCRIPTION

Figure 1:
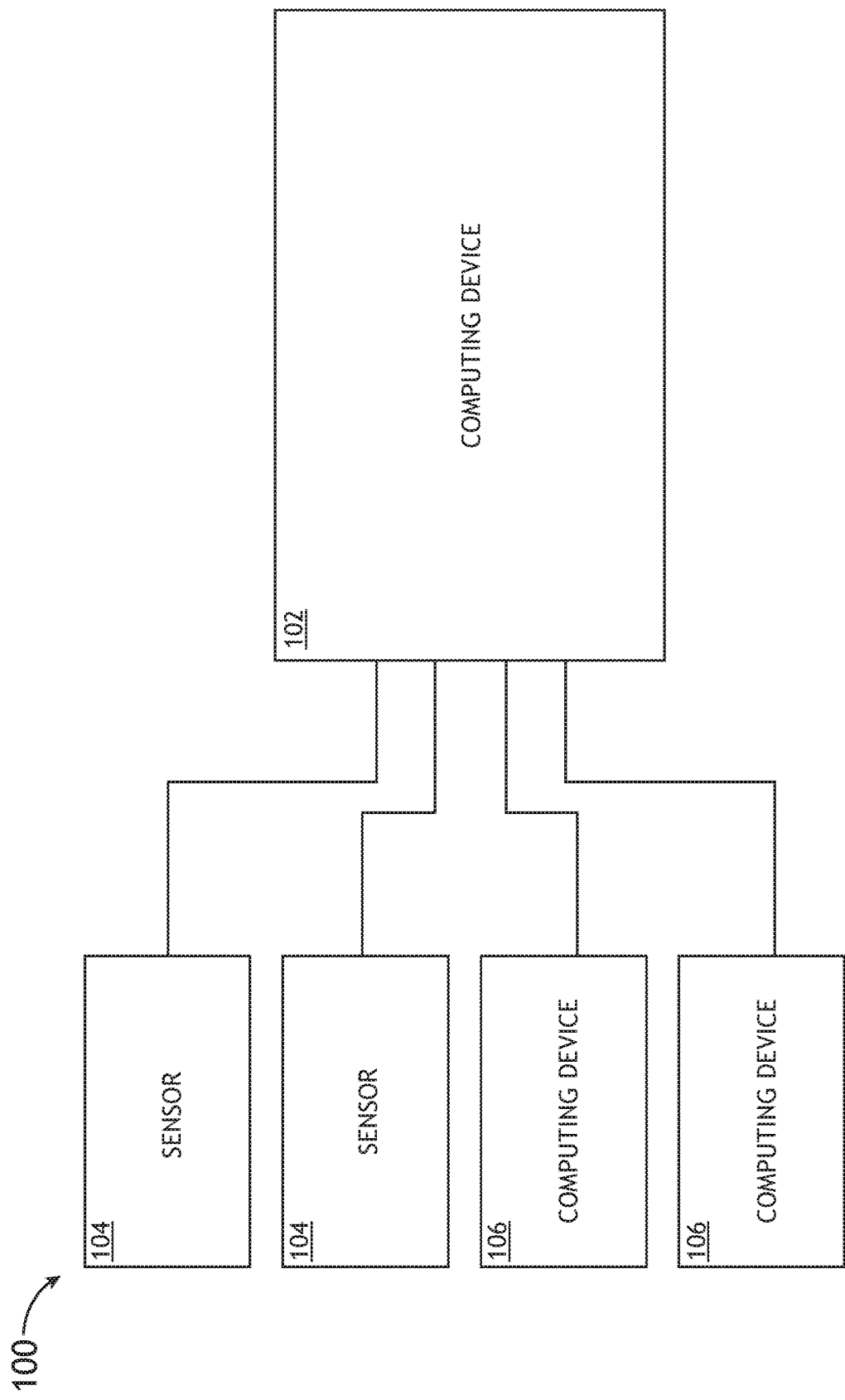
FIG. 1 is a view of an exemplary embodiment of a system according to the inventive concepts disclosed herein.
Figure 3:
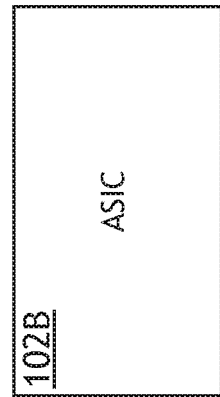
FIG. 3 is a view of the computing device of FIG. 1 as an application-specific integrated circuit (ASIC) of an exemplary embodiment according to the inventive concepts disclosed herein.
Figure 2:
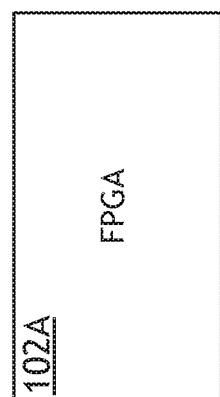
FIG. 2 is a view of the computing device of FIG. 1 as a field-programmable gate array (FPGA) of an exemplary embodiment according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of the inventive concepts disclosed herein are directed to a method and a system for monitoring delay across clock domains using a dynamic phase shift.

As FPGAs get larger and designs and interfaces become more complex, the number of clock frequencies required in a system may increase. Interfaces for dynamic memory and static memory for data storage and retrieval often cause data to cross multiple clock domains while being processed. As designs pursue smaller form factors, the probability of multiple data input sources on independent clock domains may also increase. In many instances the relationships between these domains is not vital information and as long as clock domain crossing is handled properly, there is not a need to know how clocks are related. As systems get smaller and cheaper and provide more processing power, there may be a requirement for more multi-platform data analysis and data fusion. For these analyses, determining the relationship between two clocks to determine a precise time stamp on the data may become more critical.

Multiple clock domains in computing devices (e.g., field-programmable gate arrays (FPGAs) and/or application-specific integrated circuits (ASICs)) can be sourced by separate sources or can be related in many ways through the clock distribution resources in the computing devices. The clock frequencies can be multiplied and divided, clock phases can be shifted, and multiple combinations or cascades of these can be combined to accomplish design goals. Many of the phase relationships between clocks can also change after any reset of resources in the clocking chain. The one piece of information that is always available on the clocks is the frequency or clock period of the clocks. Using this information along with a clocking resource capable of dynamic phase shifting, it is possible to find the real-time phase relationship between two clock domains and monitor this relationship to adjust as necessary.

Referring now to FIGS. 1-4, an exemplary embodiment of a system 100 according to the inventive concepts disclosed herein is depicted. The system 100 may be implemented as any suitable system, such as a vehicular system (e.g., including least one aircraft, at least one watercraft, at least one submersible craft, at least one automobile, and/or at least one train), a multiple computing device system, and/or a multiple sensor system. For example, as shown in FIG. 1, the system 100 may include a computing device 102, at least one sensor 104, and/or at least one computing device 106, some or all of which may be communicatively coupled at any given time.

Figure 4:
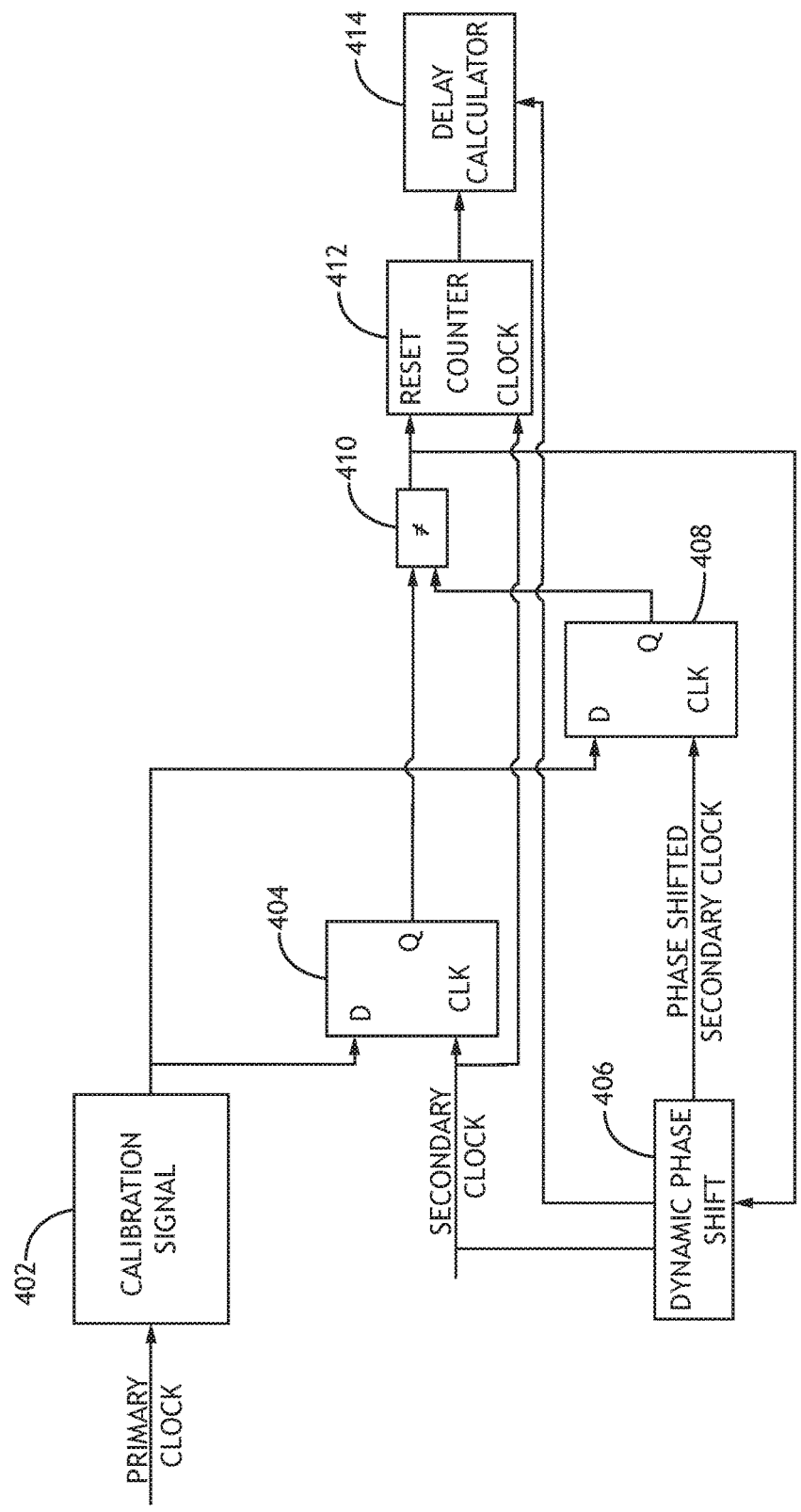
FIG. 4 is a view of the computing device of FIG. 1 of an exemplary embodiment according to the inventive concepts disclosed herein.

For example, the computing device 102 may be or include an FPGA 102A, an ASIC 102B, or a processor (e.g., a general-purpose processor). The computing device 102 may be configured to receive data streams from the sensors 104 and the computing devices 106. The computing device 102 may be configured to monitor delay across clock domains using a dynamic phase shift. The computing device 102 may be configured to perform any or all of the operations disclosed throughout. As shown in FIG. 4, the computing device 102 may include and/or may utilize a calibration signal 402, a shift register 404, a dynamic phase shift 406, a shift register 408, a comparator 410, a counter 412, and/or a delay calculator 414, some or all of which may be communicatively coupled at any given time.

The sensors 104 may be configured to sense conditions and output sensor data streams to the computing device 102.

The computing devices 106 may be configured to output data streams to the computing device 102. For example, each of the computing devices 106 may be or include an FPGA, an ASIC, or a processor (e.g., a general-purpose processor).

As used throughout, a primary clock may refer to an initial clock domain of a system where data is captured/generated.

As used throughout, a secondary clock may refer to a clock domain where data is transferred to.

As used throughout, a phase shift may refer to a delay in degrees or units of time that creates a clock identical in frequency but delayed by a known amount.

As used throughout, a zero state may refer to a position in data between two clock domains where the primary and secondary clock edges are very close, found by looking for differences in a calibration signal between the secondary clock and a phase shifted secondary clock indicating that the primary clock edge was between the two secondary clocks.

As used throughout, a dynamic phase shift may refer to a phase shift that can vary based on inputs to clock generation circuitry.

The computing device 102 may be configured to: use a primary and a secondary clock inputs with known, but not necessarily identical, clock periods; use clocking resources to generate a phase shifted secondary clock that is equal in frequency to a secondary clock domain, wherein the phase shifted secondary clock is phase shifted by a variable amount from the secondary clock; generate a calibration signal 402 in a primary clock domain; capture the calibration signal 402 in each of a secondary clock domain and the phase shifted secondary clock domain; compare a captured calibration signal value in each of the secondary clock domain and the phase shifted secondary clock domain to find a zero state where values are different, wherein the different values indicate that a primary clock domain edge occurred between the secondary clock and the phase shifted secondary clock (e.g., a dynamic phase shifted secondary clock); adjust the phase shifted secondary clock domain to be greater than an expected shift based on clock frequencies (and the step of comparing captured calibration signal values may be repeated); compare a subsequent captured calibration signal value in each of the secondary clock domain and the phase shifted secondary clock domain to find a subsequent zero state where values are different; adjust a phase shift of the phase shifted secondary clock until a shift causes all subsequent phase shifts to match such that there is not any zero state; adjust a phase shift of the phase shifted secondary clock less (e.g., slightly less) than expected based at least on clock frequency and continue to compare additional captured calibration signal values until zero states are found again; generate a counter 412 in the secondary clock domain aligned to a found zero state between phase shifts; adjust a phase shift to a next expected value based on the clock frequencies; use a counter value of the counter, a known primary clock period of the primary clock domain, a known secondary clock period of the secondary clock domain, and a current phase shift between the secondary clock and the phase shifted secondary clock to calculate (e.g., by the delay calculator 414) a current offset between a last rising edge of the primary clock and a current rising edge of the secondary clock; and/or continue to adjust and check phase shifts of the secondary clock to maintain zero state alignment and correct as necessary.

In some embodiments, the computing device 102 may be further configured to: align data across clock domains (e.g., for data fusion); align time of data from a first sensor 104 and a second sensor 104, wherein the first sensor 104 and the second sensor 104 are running at different clock rates; maintain accurate time of day synchronization in multiple clock domains for data time tagging; time tag data; align time of data from the first sensor 104 and the second sensor 104, wherein the first sensor 104 and the second sensor 104 are parallelized sensors having a same clock rate; and/or perform cryptographic operations.

Figure 5:
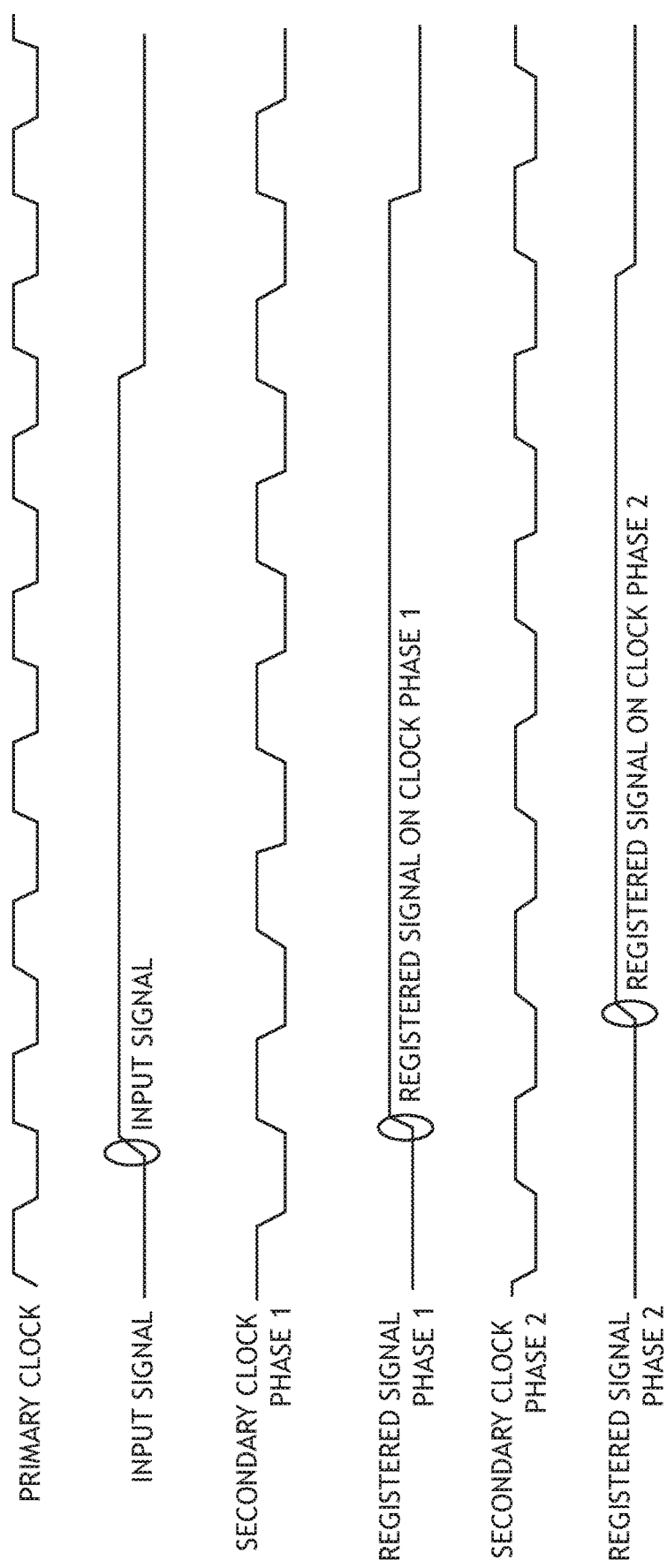
FIG. 5 is an exemplary graph illustrating ambiguity that may be seen in trying to synchronize signals across multiple clock domains of an exemplary embodiment according to the inventive concepts disclosed herein.

Referring now to FIG. 5, an exemplary graph illustrating ambiguity that may be seen in trying to synchronize signals across multiple clock domains of an exemplary embodiment according to the inventive concepts disclosed herein is depicted. The input signal may be registered into the secondary clock domain on phase 1, phase 2 or anywhere in between and can change anytime the board is reset. For example, at 100 MHz this may result in 10 nanoseconds (ns) of ambiguity if nothing is done to determine the relationships between the clocks.

Knowing only the clock periods of two clocks, the time differential change from clock edges can be established. For a clock with period of X ns and another clock with period Y ns, each clock edge will introduce an extra delay of Y-X nanoseconds. For example, if Clock1 has a 10 ns period and Clock2 has a 12 ns period, every edge of Clock2 moves 2 ns further from the same number edge in Clock1 as shown in FIG. 6.

In this simple example illustrated in FIG. 6, it can be seen that the relationship is periodic as well, since Clock1 and Clock2 realign at 60 ns intervals. The realignment period is established by the least common multiple of the two clock periods and depending on the clock periods involved could be a very long time. This simple illustration also assumes that the two clocks are aligned in phase. Clock2 could have easily had the initial edge at 7 ns meaning that the two clocks never fully realign, but the delay pattern still resets every 60 ns.

Figure 7:
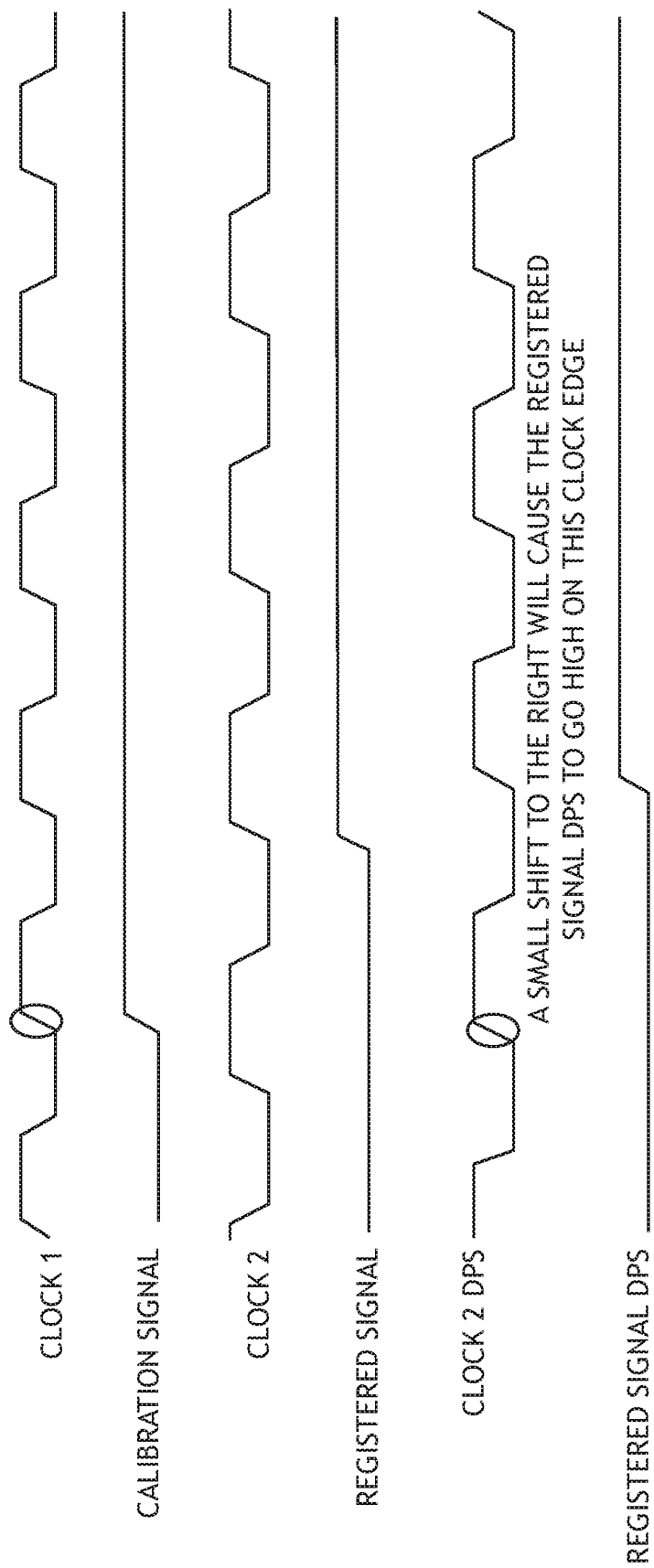
FIG. 7 is an exemplary graph illustrating a desired end state of the dynamic phase shift calibration associated with the graph of FIG. 5 according to the inventive concepts disclosed herein.

A calibration signal that toggles in the Clock1 domain can be used in the Clock2 domain along with a dynamic phase shifted Clock2 to determine a relationship between Clock1 and Clock2. By registering the calibration signal in both Clock2 domain and the Clock2 dynamic phase shifted (DPS) domain, the values of the registered signals can be compared and used to phase shift Clock2 DPS to a point where a small change in the phase shift changes the relationship between the registered signals. FIG. 7 illustrates the desired end state of the dynamic phase shift calibration. The calibration signal sampled on Clock2 goes high while the registered signal on Clock2 DPS is still low and the Clock2 DPS signal is very close to the Clock1 rising edge. Any further shift on Clock2 DPS would result in the Registered Signal DPS being high when the calibration signal on Clock2 is first sampled high.

The phase shift end state can be found by starting with the Clock2 and Clock2 DPS aligned and doing coarse phase shifts to find a point where the Calibration signal is sampled high in the Clock2 domain while the registered signal in the Clock2 DPS domain is low. From there a finer phase shift adjustment can be utilized to fine tune to a point where the next increment would change the relationship between the sampling of the Calibration signal and the registered version on the Clock2 DPS domain.

If the dynamic phase shifting capabilities allow for a new phase shift on every Clock2 clock period, the phase can be adjusted on every Clock2 edge to account for the additional delay as seen in the example in FIG. 6. This adjustment can be used as the delay tracking and a constant monitor of the clocks to maintain alignment.

If the phase shift takes a few clocks to take effect, then the phase shift may have to take into account the delays as shown in the example in FIG. 6 to maintain the alignment across multiple clock periods for the next sampling when the phase shift is valid. In the interim time between phase shifts, counting clock edges in the Clock2 domain along with the additional delays per clock period is given by the following equation, which may determine additional phase shift in ns on a delayed phase shift:

Clocks until Phase Shift*(Clock2 Period−Clock1 Period)=Phase adjustment for next cycle This methodology can also be used to determine the nondeterministic phase shift that can occur when dividing a high-speed clock into a lower-speed clock through separate dividers that provide the same frequency but might not be synchronized. The search may allow for finding the phase shift of clocks running at the same frequency and for continuous monitoring of the alignment.

By using a dynamic phase shift to find and maintain the relationships between clocks, it may become possible to adjust data streams and time stamps that run on different clock domains to be synchronized to accuracies of 1 ns or less. This could be utilized to have internal time counters for tagging data across clock domains without any of the ambiguity that typically resides in a clock domain crossing. This can also be used to synchronize and fuse multiple data sources on different clock domains or synchronize multiple inputs from identical sources that may only differ in the interface clock phase relationships.

Figure 8:
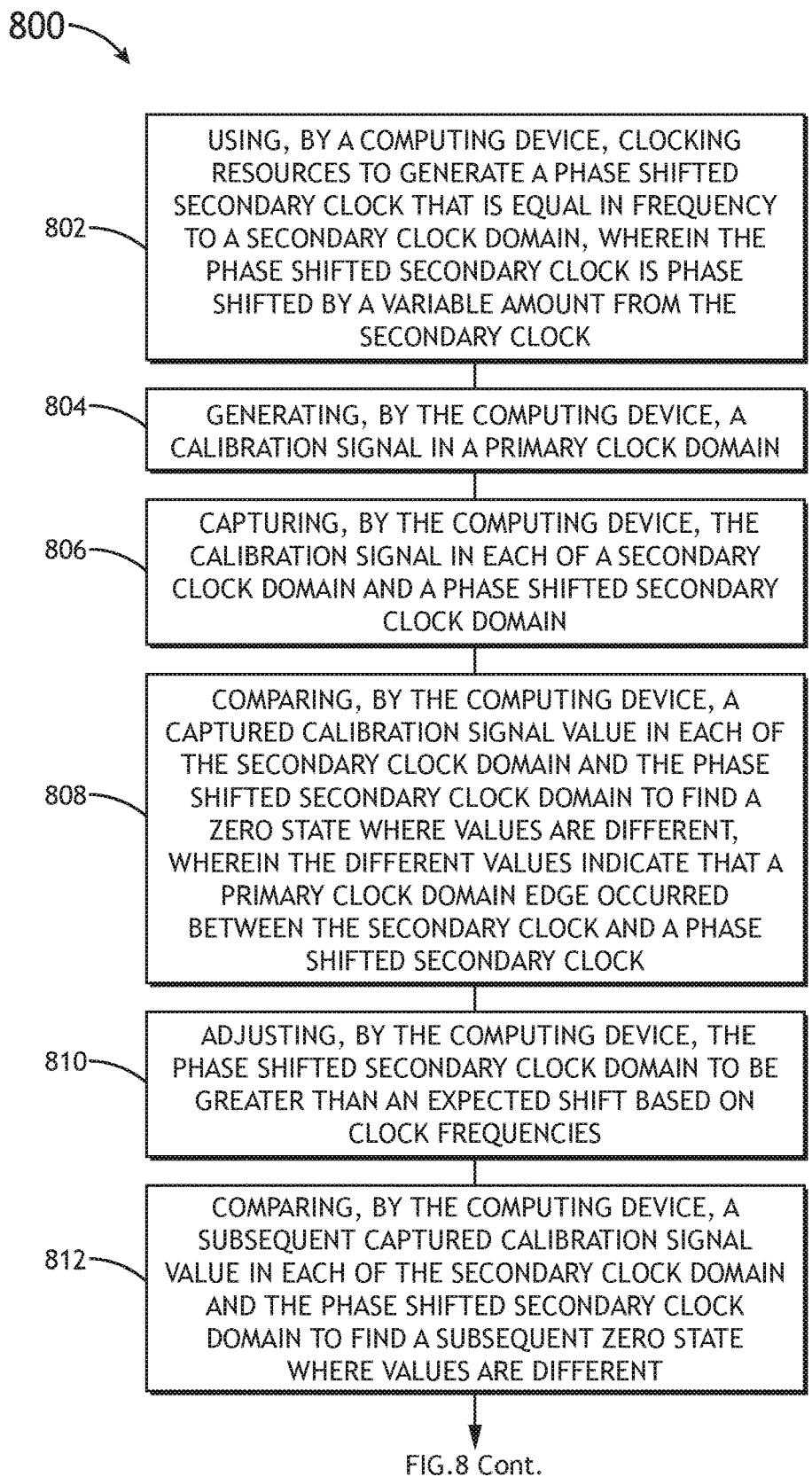
FIG. 8 is a diagram of an exemplary embodiment of a method according to the inventive concepts disclosed herein.
Figure 8:
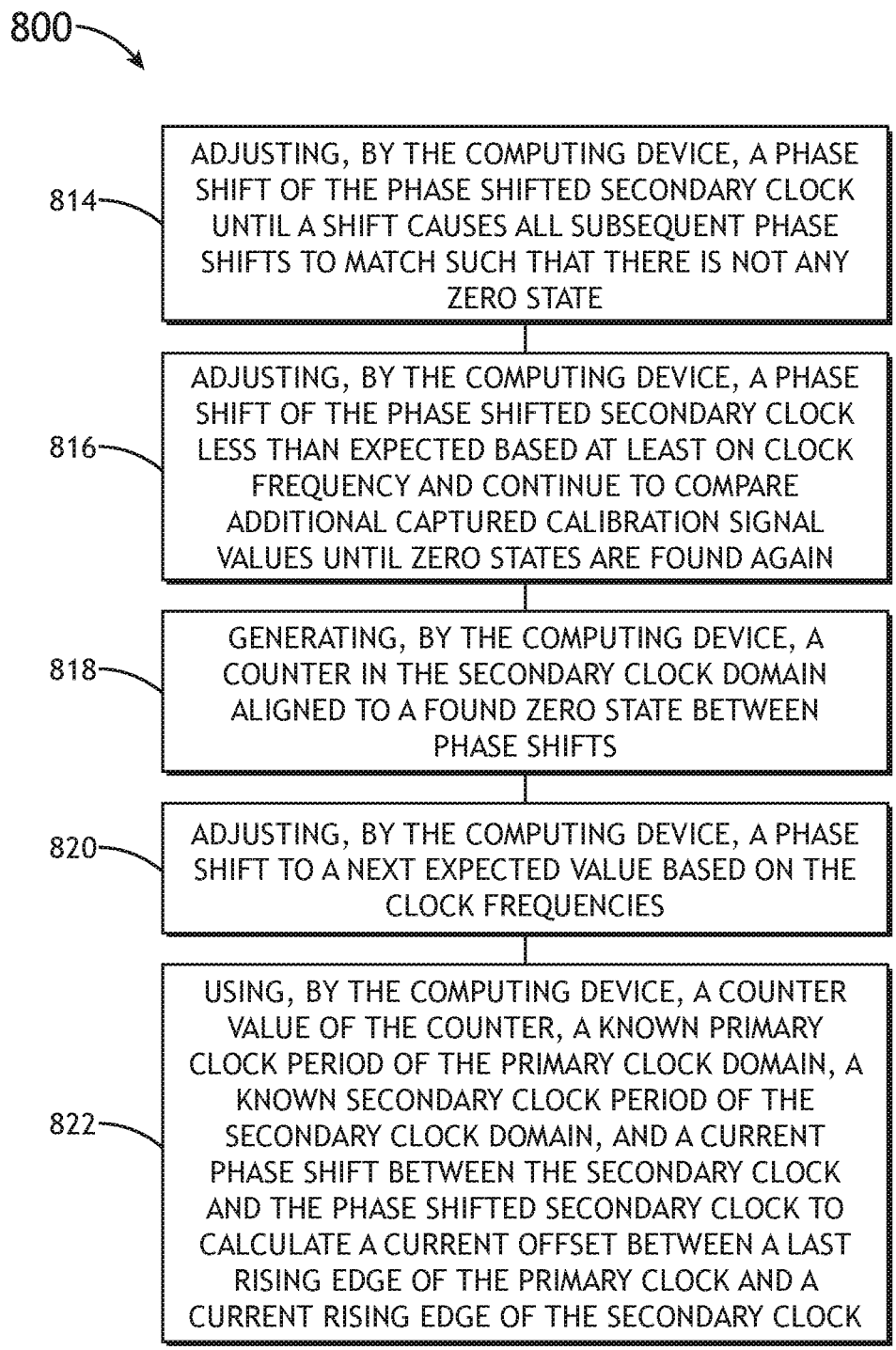

Referring now to FIG. 8, an exemplary embodiment of a method 800 according to the inventive concepts disclosed herein may include one or more of the following steps. Additionally, for example, some embodiments may include performing one more instances of the method 800 iteratively, concurrently, and/or sequentially. Additionally, for example, at least some of the steps of the method 800 may be performed in parallel and/or concurrently. Additionally, in some embodiments, at least some of the steps of the method 800 may be performed non-sequentially.

A step 802 may include using, by a computing device, clocking resources to generate a phase shifted secondary clock that is equal in frequency to a secondary clock domain, wherein the phase shifted secondary clock is phase shifted by a variable amount from the secondary clock.

A step 804 may include generating, by the computing device, a calibration signal in a primary clock domain.

A step 806 may include capturing, by the computing device, the calibration signal in each of a secondary clock domain and the phase shifted secondary clock domain.

A step 808 may include comparing, by the computing device, a captured calibration signal value in each of the secondary clock domain and the phase shifted secondary clock domain to find a zero state where values are different, wherein the different values indicate that a primary clock domain edge occurred between the secondary clock and the phase shifted secondary clock.

A step 810 may include adjusting, by the computing device, the phase shifted secondary clock domain to be greater than an expected shift based on clock frequencies.

A step 812 may include comparing, by the computing device, a subsequent captured calibration signal value in each of the secondary clock domain and the phase shifted secondary clock domain to find a subsequent zero state where values are different.

A step 814 may include adjusting, by the computing device, a phase shift of the phase shifted secondary clock until a shift causes all subsequent phase shifts to match such that there is not any zero state.

A step 816 may include adjusting, by the computing device, a phase shift of the phase shifted secondary clock less than expected based at least on clock frequency and continue to compare additional captured calibration signal values until zero states are found again.

A step 818 may include generating, by the computing device, a counter in the secondary clock domain aligned to a found zero state between phase shifts.

A step 820 may include adjusting, by the computing device, a phase shift to a next expected value based on the clock frequencies.

A step 822 may include using, by the computing device, a counter value of the counter, a known primary clock period of the primary clock domain, a known secondary clock period of the secondary clock domain, and a current phase shift between the secondary clock and the phase shifted secondary clock to calculate a current offset between a last rising edge of the primary clock and a current rising edge of the secondary clock.

Further, the method 800 may include any of the operations disclosed throughout.

As will be appreciated from the above, embodiments of the inventive concepts disclosed herein may be directed to a method and a system for monitoring delay across clock domains using a dynamic phase shift.

As used throughout and as would be appreciated by those skilled in the art, "at least one non-transitory computer-readable medium" may refer to as at least one non-transitory computer-readable medium (e.g., e.g., at least one computer-readable medium implemented as hardware; e.g., at least one non-transitory processor-readable medium, at least one memory (e.g., at least one nonvolatile memory, at least one volatile memory, or a combination thereof; e.g., at least one random-access memory, at least one flash memory, at least one read-only memory (ROM) (e.g., at least one electrically erasable programmable read-only memory (EEPROM)), at least one on-processor memory (e.g., at least one on-processor cache, at least one on-processor buffer, at least one on-processor flash memory, at least one on-processor EEPROM, or a combination thereof), or a combination thereof), at least one storage device (e.g., at least one hard-disk drive, at least one tape drive, at least one solid-state drive, at least one flash drive, at least one readable and/or writable disk of at least one optical drive configured to read from and/or write to the at least one readable and/or writable disk, or a combination thereof), or a combination thereof).

As used throughout, "at least one" means one or a plurality of; for example, "at least one" may comprise one, two, three, . . . , one hundred, or more. Similarly, as used throughout, "one or more" means one or a plurality of; for example, "one or more" may comprise one, two, three, . . . , one hundred, or more. Further, as used throughout, "zero or more" means zero, one, or a plurality of; for example, "zero or more" may comprise zero, one, two, three, . . . , one hundred, or more.

In the present disclosure, the methods, operations, and/or functionality disclosed may be implemented as sets of instructions or software readable by a device. Further, it is understood that the specific order or hierarchy of steps in the methods, operations, and/or functionality disclosed are examples of exemplary approaches. Based upon design preferences, it is understood that the specific order or hierarchy of steps in the methods, operations, and/or functionality can be rearranged while remaining within the scope of the inventive concepts disclosed herein. The accompanying claims may present elements of the various steps in a sample order, and are not necessarily meant to be limited to the specific order or hierarchy presented.

It is to be understood that embodiments of the methods according to the inventive concepts disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

From the above description, it is clear that the inventive concepts disclosed herein are well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the broad scope and coverage of the inventive concepts disclosed and claimed herein.

What is claimed is:

1. A system, comprising:
   a computing device configured to:
   use a primary clock of a primary clock domain and a secondary clock of a secondary clock domain;
   generate a phase shifted secondary clock that is equal in frequency to the secondary clock domain, wherein the phase shifted secondary clock is phase shifted by a variable amount from the secondary clock;
   generate a calibration signal in the primary clock domain;
   capture the calibration signal in each of the secondary clock domain and a phase shifted secondary clock domain;
   compare a captured calibration signal value in each of the secondary clock domain and the phase shifted secondary clock domain to find a zero state where values are different, wherein the different values indicate that a primary clock domain clock edge occurred between the secondary clock and the phase shifted secondary clock;
   adjust the phase shifted secondary clock domain to be greater than an expected shift based on clock frequencies;
   compare a subsequent captured calibration signal value in each of the secondary clock domain and the phase shifted secondary clock domain to find a subsequent zero state where values are different;
   adjust a phase shift of the phase shifted secondary clock until a shift causes all subsequent phase shifts to match such that there is not any zero state;
   adjust a phase shift of the phase shifted secondary clock less than expected based at least on clock frequency and continue to compare additional captured calibration signal values until zero states are found again;
   generate a counter in the secondary clock domain aligned to a found zero state between phase shifts;
   adjust a phase shift to a next expected value based on the clock frequencies; and
   use a counter value of the counter, a known primary clock period of the primary clock domain, a known secondary clock period of the secondary clock domain, and a current phase shift between the secondary clock and the phase shifted secondary clock to calculate a current offset between a last rising edge of the primary clock and a current rising edge of the secondary clock.

2. The system of claim 1, wherein the computing device is further configured to continue to adjust and check phase shifts of the secondary clock to maintain zero state alignment.

3. The system of claim 1, wherein the phase shifted secondary clock is a dynamic phase shifted secondary clock.

4. The system of claim 1, wherein the computing device is further configured to align data across clock domains.

5. The system of claim 1, wherein the computing device is further configured to align data across clock domains for data fusion.

6. The system of claim 1, further comprising a first sensor and a second sensor, wherein the computing device is further configured to align time of data from the first sensor and the second sensor, wherein the first sensor and the second sensor are running at different clock rates.

7. The system of claim 1, wherein the computing device is further configured to: maintain accurate time of day synchronization in multiple clock domains for data time tagging; and time tag data.

8. The system of claim 1, further comprising a first sensor and a second sensor, wherein the computing device is further configured to align time of data from the first sensor and the second sensor, wherein the first sensor and the second sensor are parallelized sensors having a same clock rate.

9. The system of claim 1, wherein the computing device is a field-programmable gate array (FPGA).

10. The system of claim 1, wherein the computing device is an application-specific integrated circuit (ASIC).

11. A method, comprising:
    using, by a computing device, a primary clock of a primary clock domain and a secondary clock of a secondary clock domain;
    generating, by the computing device, a phase shifted secondary clock that is equal in frequency to the secondary clock domain, wherein the phase shifted secondary clock is phase shifted by a variable amount from the secondary clock;
    generating, by the computing device, a calibration signal in the primary clock domain;
    capturing, by the computing device, the calibration signal in each of the secondary clock domain and a phase shifted secondary clock domain;
    comparing, by the computing device, a captured calibration signal value in each of the secondary clock domain and the phase shifted secondary clock domain to find a zero state where values are different, wherein the different values indicate that a primary clock domain clock edge occurred between the secondary clock and the phase shifted secondary clock;
    adjusting, by the computing device, the phase shifted secondary clock domain to be greater than an expected shift based on clock frequencies;
    comparing, by the computing device, a subsequent captured calibration signal value in each of the secondary clock domain and the phase shifted secondary clock domain to find a subsequent zero state where values are different;

adjusting, by the computing device, a phase shift of the phase shifted secondary clock until a shift causes all subsequent phase shifts to match such that there is not any zero state;

adjusting, by the computing device, a phase shift of the phase shifted secondary clock less than expected based at least on clock frequency and continue to compare additional captured calibration signal values until zero states are found again;

generating, by the computing device, a counter in the secondary clock domain aligned to a found zero state between phase shifts;

adjusting, by the computing device, a phase shift to a next expected value based on the clock frequencies; and using, by the computing device, a counter value of the counter, a known primary clock period of the primary clock domain, a known secondary clock period of the secondary clock domain, and a current phase shift between the secondary clock and the phase shifted secondary clock to calculate a current offset between a last rising edge of the primary clock and a current rising edge of the secondary clock.

12. The method of claim 11, further comprising continuing, by the computing device, to adjust and check phase shifts of the secondary clock to maintain zero state alignment.

13. The method of claim 11, wherein the computing device is a field-programmable gate array (FPGA) or an application-specific integrated circuit (ASIC).

14. The method of claim 11, further comprising aligning, by the computing device, data across clock domains.

15. The method of claim 11, further comprising align, by the computing device, time of data from a first sensor and a second sensor.

* * * * *